United States Patent Office 3,032,579
Patented May 1, 1962

3,032,579
PROCESS FOR THE PREPARATION OF AN N-MONOALKYLAMIDE OF O,O-DIMETHYLDI-THIOPHOSPHORYLACETIC ACID
Giuseppe Losco and Cesare Augusto Peri, Milan, Italy, assignors to Montecatini, Societa Generale per l'Industria Mineraria e Chimica, Milan, Italy, a corporation of Italy
No Drawing. Filed July 27, 1959, Ser. No. 829,535
Claims priority, application Italy Nov. 20, 1958
8 Claims. (Cl. 260—461)

The present invention relates to a process for the preparation of an N-monoalkylamide of O,O-dimethyldithiophosphorylacetic acid having the following formula:

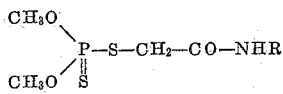

in which R is a lower alkyl, preferably a methyl or an ethyl, radical.

The interesting insecticidal properties of the N-monoalkylamides of O,O-dimethyldithiophosphorylacetic acid which are characterized by remarkable insecticide activity and by low toxicity against warm-blooded animals are generally known.

As an illustration of the high insecticidal activity coupled with low toxicity towards warm-blooded animals of the N-mono-ethylamide of O,O-dimethyldithiophosphorylacetic acid, we report hereinbelow some biological data of this compound in comparison with those of other known insecticides:

activity and the toxicity against warm-blooded animals, it became important to find some new way of synthesis which might reduce or eliminate the above mentioned deficiencies. It has been now surprisingly found by us that compounds of this type may be obtained with a high yield and with a high degree of purity by reacting, under certain conditions, a primary aliphatic amine, with an alkyl or an aryl ester of the O,O-dimethyldithiophosphorylacetic acid. This process, which forms the object of the present invention, may be expressed by the following reaction:

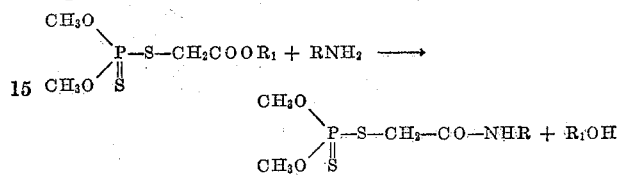

where R is a lower alkyl, preferably a methyl or ethyl radical, while $R_1$ is an alkyl or an arylalkyl, preferably methyl, ethyl, or benzyl, radical.

Particularly surprising is the fact that the amine reacts under determined experimental conditions prevalently on the carboxy-alkyl or -aryl group without producing substantial alterations, contrary to expectation based upon the known unstability of products of this type against the alkalis.

The object of the present invention is a process for the preparation of an N-monoalkylamide of O,O-dimethyldithiophosphorylacetic acid having a high degree of

TABLE I

| Compound | Acute Oral Toxicity, LD 50=mg. of active substance per kg. of animal | Activity against *Aphis fabae*, LD 95=g. of active substance per 100 ml. of aqueous dispersion | Activity against *Tetranychus* Telarius LD 95=g. of active substance per 100 ml. of aqueous dispersion | Systemic activity by radical absorption (on *Aphis fabae*), LD 95=g. of active substance per 100 ml. of aqueous dispersion |
|---|---|---|---|---|
| Parathion (O,O-diethyl o-p-nitrophonyl phosphorothioate). | 8.2 (on mice) | 0.00096 | 0.0007 | |
| Systox (O,O-diethyl O-2-(ethylthio) ethylthiophosphate). | 6-12 (on rats) | | | 0.15 |
| N-monoethylamide of O,O-dimethyldithiophosphorylacetic acid. | 168 (on rats) | 0.00036 | 0.00045 | 0.15 |

The N-monoalkylamides of O,O-dimethyldithiophosphorylacetic acid are commonly prepared according to the process disclosed in Italian specification No. 561,701, by reacting in aqueous solution at a temperature between 10 and 15° C. an N-alkylchloroacetamide with an alkaline salt (for example sodium salt) of O,O-dimethyldithiophosphoric acid. To obtain acceptable yields, it is however necessary, according to the above mentioned method, to carry out the reaction for a very long time, since said reaction is extremely slow. Another deficiency encountered in the above mentioned process is the possibility of formation of some by-products, which both decrease proportionally the yield and may pollute the final product. Among these impurities, a particularly obnoxious one, in the case of the former method of preparation of the N-monomethylamide of O,O-dimethyldithiophosphorylacetic acid, is the O,O-dimethyl-S-methyldithiophosphate, which for its insolubility in water and for its high solvent power on the N-monomethylamide of O,O-dimethyldithiophosphorylacetic acid, is toughly bound to it, polluting it. The O,O-dimethyl-S-methyldithiophosphate can be removed only partially and by laborious means, thereby producing unavoidably a further reduction of yield.

Since the purity of the compounds of the type herein produced is an essential factor, for both the insecticidal purity, by reacting at low temperature an alkyl- or arylester of the O,O-dimethyldithiophosphorylacetic acid with a primary aliphatic lower amine. Preferably the monomethylamine or the monoethylamine are employed. The fundamental characteristic of this new process is the high reaction rate also in a heterogeneous phase. Another characteristic of this method is the high purity of the final product, due to the exclusion or extreme curtailment of all the side reactions experienced in the known process due to hydrolytic processes acting on the starting substances or on the end product. In fact, according to the process which is the object of the present invention, it is possible to obtain an end product having about 98% of active substances without any further purification step. The reaction between the phosphoric ester and the amine being exothermic, it is necessary to cool the reaction mass and to shake it efficiently.

The reaction is carried out according to the present invention at temperatures ranging from about —60° to about +20° C. Generally the best results are obtained by operating around 0° C. or substantially at that temperature. The reaction may be carried out in the presence of an inert liquid capable of dissolving one or both the reactants such as, for example, water, lower alcohols, methylene-chloride, etc. The amine may be employed either in stoichiometric quantity or in excess. It is possible to use, for instance, the aqueous solutions of amines at concentrations which may be found on the market (about 30–35% for the monomethylamine and about 70% for the monoethylamine). As esters of O,O-dimethyldithiophosphorylacetic acid there may be employed preferably the methyl ester, the ethyl ester or the benzyl ester, which may be prepared as follows:

(A) *Methyl ester of the O,O-dimethyldithiophosphorylacetic acid.*—2.93 kg. of methylchloroacetate are added to 11.97 liters of an aqueous solution of the sodium salt of O,O-dimethyldithiophosphorylacetic acid (containing 2.26 moles/liter). The mixture is then heated under stirring to 50–55° C. for 6 hours. The methyl ester of O,O-dimethyldithiophosphorylacetic acid formed is separated from the aqueous overstanding phase and subjected to purification by vacuum distillation. 4.7 kg. of end product having a boiling point of 125–132° C. under a pressure of 0.4–0.5 mm. Hg and consisting of practically pure product, are thus obtained.

(B) *Ethyl ester of O,O-dimethyldithiophosphorylacetic acid.*—245 g. of ethylmonochloroacetate are added to 885 cc. of an aqueous solution of the sodium salt of O,O-dimethyldithiophosphorylacetic acid (containing 2.26 moles/ liter). The mixture is heated to 50–55° C. for 6 hours under stirring. After cooling, the aqueous overstanding phase is removed while the organic phase is washed with 200 ml. of water and purified by vacuum distillation. 322 g. of a fraction boiling at 130–136° C. under a pressure of 0.01 mm. Hg, consisting of practically pure product, are obtained.

(C) *Benzyl ester of O,O-dimethyldithiophosphorylacetic acid.*—229 g. of benzylmonobromacetate are added to 490 cc. of an aqueous solution of the sodium salt of O,O-dimethyldithiophosphorylacetic acid (containing 2.26 moles/liter). The mixture is then heated to 60° C. for two hours under vigorous stirring. After cooling, the aqueous overstanding phase is removed. The residue is an oily product (270 gr.) consisting substantially of the benzylester of O,O-dimethyldithiophosphorylacetic acid.

The following examples are given in order to illustrate the process of preparation of the monoalkylamides of O,O-dimethyldithiophosphorylacetic acid, it being of course understood that these examples do not limit the present invention in any manner.

*Example 1*

20.2 g. of monomethylamine, dissolved in 50 ml. of methyl alcohol, are added under cooling to 100 g. of methyl ester of O,O-dimethyldithiophosphorylacetic acid. The addition of the reactants and the cooling are adjusted in such a manner that the temperature of the reacting liquid is maintained for a period of 7 hours at a temperature of substantially 0° C. After this period, the greatest part of the solvent and the amine introduced in excess are eliminated by distillation under reduced pressure. The residue is dissolved in 50 ml. of methylene chloride and then washed twice by shaking with 100 ml. of water. After evaporation of the solvent under reduced pressure 63 g. of an oily liquid, solidifying by cooling at 15–20° C., are obtained. This product has a purity of 90.5% as to N-monomethylamide of O,O-dimethyldithiophosphorylacetic acid.

*Example 2*

13.5 g. of monomethylamine dissolved in 50 g. of methyl alcohol are added to 100 g. of methyl ester of O,O-dimethyldithiophosphorylacetic acid while the temperature is maintained between —30 and —40° C. After 7 hours maintenance at this temperature, 50 ml. of methylene chloride and 100 ml. of water are added.

The hydroalcoholic overstanding phase is separated while the lower phase, after a second washing with water, is concentrated under reduced pressure. A residue is obtained of 85 g. of N-monomethylamide of O,O-dimethyldithiophosphorylacetic acid having a purity of 77%.

*Example 3*

20.2 g. of monomethylamine dissolved in 50 ml. of methyl alcohol are added at the temperature of —60° C. to 100 g. of methyl ester of O,O-dimethyldithiophosphorylacetic acid. After 4 hours contact, at —60° C., 60 ml. of methylene chloride and then 100 ml. of water are added. The lower phase formed is collected, and after having been washed with water, is concentrated under reduced pressure. 90 g. of product are obtained, which solidifies partially and has a purity of 67.5% as to N-monomethylamide of O,O-dimethyldithiophosphorylacetic acid.

*Example 4*

470 g. of a 34% monomethylamine aqueous solution are added under vigorous agitation in a period of two hours to 1000 g. of methyl ester of O,O-dimethyldithiophosphorylacetic acid while maintaining a temperature of about 0° C. 500 ml. of methylene chloride are then added and the aqueous liquid is eliminated. The lower phase, after having been washed a second time with water, is concentrated under reduced pressure. 870 g. of N-monomethylamide of O,O-dimethyldithiophosphorylacetic acid, having a purity of 95.8% and a s.p. of 45° C. are obtained.

*Example 5*

81 g. of 25% monomethylamine aqueous solution are added under vigorous stirring to 100 g. of methyl ester of O,O-dimethyldithiophosphorylacetic acid while maintaining the temperature at —15° C. for 7 hours. By operating as indicated in Example 3, 85 g. of a residue consisting of an oily liquid are obtained, which solidifies by by cooling to 15–20° C. The obtained N-monomethylamide of the O,O-dimethyldithiophosphorylacetic acid has a purity of 85%.

*Example 6*

37.2 g. of a 25% monomethylamine aqueous solution are added under stirring to 69 g. methyl ester of O,O-dimethyldithiophosphorylacetic acid. The temperature is maintained at 20° C. for a period of 7 hours. By operating as indicated in Example 4, 43 g. of an oily liquid consisting of 54% N-monomethylamide of O,O-dimethyldithiophosphorylacetic acid are obtained.

*Example 7*

81 g. of a 25% monomethylamine aqueous solution are added in two and a half hours under good stirring to 100 g. methyl ester of O,O - dimethyldithiophosphorylacetic acid, dissolved in 50 ml. of methylene chloride, while maintaining a temperature of 0° C. The lower phase is separated and after having been washed with water it is concentrated under reduced pressure. 82 g. of a product, consisting of 88% N-monomethylamide of O,O-dimethyldithiophosphorylacetic acid, are obtained.

*Example 8*

868 g. of an aqueous solution of monomethylamine at 34.3% are added at 0° C. in about two hours under agitation to 1840 g. of methyl ester of O,O-dimethyldithiophosphorylacetic acid. After another two hours of agitation at 0° C., 1000 ml. of ice water are introduced and, still at the same temperature the reaction mass is exactly neutralized with a 10% sulphuric acid solution.

The mass is then centrifuged by means of a basket centrifuge and washed with 100 ml. of water. The white crystalline product is dried at a low temperature.

1526 g. of monomethylamide of O,O,-dimethyldithiophosphorylacetic acid, having a M.P. 49° C. and a purity of 98%, are obtained.

*Example 9*

318 g. of a 70% (weight) monoethylamine aqueous solution are added under cooling to 920 g. of methyl ester of O,O-dimethyldithiophosphorylacetic acid. The addition of the reactants and the cooling are so regulated that the temperature of the reaction mass is maintained at 0° C. for a period of two and a half hours. 2000 ml. ice water are then introduced and the reaction mass is centrifuged. After drying in air, 740 g. of monoethylamide of O,O-dimethyldithiophosphorylacetic acid, having a M.P. of 65–66° C. and a purity of 98%, are obtained.

*Example 10*

39 g. of a 70% monoethylamine aqueous solution are added under cooling at 0° C. to 122 g. of ethyl ester of O,O-dimethyldithiophosphorylacetic acid. The reaction mass is then agitated at 0° C. for 4 hours and then diluted with 150 ml. of cold water.

The crystals are collected on a Buchner device and washed with 250 ml. of water. After drying, 89 g. of monoethylamide of O,O-dimethyldithiophosphorylacetic acid are obtained.

*Example 11*

153 g. of benzyl ester of O,O-dimethyldithiophosphorylacetic acid are mixed at 0° C. with 39 g. of a 70% aqueous solution of monoethylamine. The reaction mass is agitated for 4 hours at 0° C., then 100 ml. of methylene chloride and 50 ml. of water are introduced. After further stirring, the reaction mass is left to rest. The overstanding aqueous phase is removed, while the organic phase is concentrated in water bath in order to eliminate the methylene chloride. The 161 g. of residue are heated to 75–85° C. under reduced pressure (0.4–0.6 mm. Hg) in order to eliminate the benzyl alcohol formed. 121 g. of a sirupy oil, solidifying at 38.5° C. and containing 83% of monoethylamide of O,O-dimethyldithiophosphorylacetic acid, are obtained.

*Example 12*

188 ml. of a 70% monoethylamine aqueous solution are added to 460 g. of methyl ester of O,O-dimethyldithiophosphorylacetic acid, cooled at between −15 and −20° C. The introduction of the amine is carried out in two hours, while vigorously stirring the reaction mass at a constant temperature of −15–20° C. The reaction mass is then stirred for a further two hours at the indicated temperature and then diluted with 500 ml. of cold water. The whole is then transferred onto a filter and washed with 500 ml. of water. After drying in air, 421 g. of monoethylamide of O,O-dimethyldithiophosphorylacetic acid, having a M.P. of 63–65° C. and a purity of 97%, are obtained.

*Example 13*

460 g. of methyl ester of O,O-dimethyldithiophosphorylacetic acid are diluted with 150 ml. of methanol. To the resulting liquid, cooled to 0° C., are added, while vigorously stirring, 188 ml. of a 70% monoethylamine aqueous solution.

The introduction of the amine is carried out in two hours, while the temperature of the reaction mass is maintained at 0° C. The reaction mass is stirred for two hours more at the same temperature, then adding 1000 ml. of cold water. The whole is transferred onto a Buchner filter where it is washed with 500 ml. of cold water. After drying in air, 351 g. of monoethylamide of O,O-dimethyldithiophosphorylacetic acid having a M.P. of 62–64.5° C., are obtained.

What is claimed is:

1. Process for the preparation of an N-monoalkylamide of O,O-dimethyldithiophosphorylacetic acid which comprises reacting an ester selected from the group consisting of an alkyl ester of O,O-dimethyldithiophosphorylacetic acid and an arylalkyl ester of O,O-dimethyldithiophosphorylacetic acid and a monoalkylamine at a temperature ranging from about −60° to about +20° C.
2. The process of claim 1, wherein at least one of the reagents is in solution.
3. The process of claim 1, in which said ester is methyl ester.
4. The process of claim 1, in which said ester is ethyl ester.
5. The process of claim 1, in which said ester is benzyl ester.
6. The process of claim 1, in which said amine is a lower aliphatic amine.
7. The process of claim 1, in which said amine is monomethylamine.
8. The process of claim 1, in which the reaction temperature is substantially 0° C.

References Cited in the file of this patent

UNITED STATES PATENTS

| | | |
|---|---|---|
| 2,494,283 | Cassaday et al. | Jan. 10, 1950 |
| 2,881,201 | Schrader | Apr. 7, 1959 |
| 2,890,947 | Annable et al. | June 16, 1959 |

FOREIGN PATENTS

| | | |
|---|---|---|
| 791,824 | Great Britain | Mar. 12, 1958 |

OTHER REFERENCES

Hewitt et al.: "J. Econ. Entom.," vol. 51, pp. 126–131 (April 1958).